US007640429B2

(12) United States Patent
Huang et al.

(10) Patent No.: US 7,640,429 B2
(45) Date of Patent: Dec. 29, 2009

(54) CRYPTOGRAPHICALLY ENFORCED, MULTIPLE-ROLE, POLICY-ENABLED OBJECT DISSEMINATION CONTROL MECHANISM

(75) Inventors: Ming-Yuh Huang, Bellevue, WA (US); Paul L. Allen, Redmond, WA (US); Phyllis Melvin, Seattle, WA (US); Keith E. Williamson, Bothell, WA (US); Philip J. Attfield, Fall City, WA (US)

(73) Assignee: The Boeing Company, Chicago, IL (US)

( * ) Notice: Subject to any disclaimer, the term of this patent is extended or adjusted under 35 U.S.C. 154(b) by 795 days.

(21) Appl. No.: 10/788,151

(22) Filed: Feb. 26, 2004

(65) Prior Publication Data
US 2005/0193196 A1 Sep. 1, 2005

(51) Int. Cl.
 *H04L 29/06* (2006.01)
(52) U.S. Cl. .......................... 713/166; 713/182; 726/4; 726/21; 380/256; 380/255
(58) Field of Classification Search ................. 713/166; 726/1, 21; 380/255, 256
See application file for complete search history.

(56) References Cited

U.S. PATENT DOCUMENTS

| 5,881,225 | A  | * | 3/1999 | Worth ........................... 726/17 |
| 6,757,680 | B1 | * | 6/2004 | Choy ............................. 707/9  |
| 7,219,234 | B1 | * | 5/2007 | Ashland et al. ............. 713/182      |

FOREIGN PATENT DOCUMENTS

| EP | 0697662  | B | * | 5/2001 |
| GB | 2353875  | A | * | 3/2001 |
| WO | WO 96/17284 | | * | 6/1996 |
| WO | WO 96/17285 | | * | 6/1996 |

OTHER PUBLICATIONS

"IntranetWare Integrates NetWare Application Launcher", Novell, Sep. 3, 1996. (www.novell.com/press/archive/1996/09/pr96160.html).*
Novell Delivers New Software Distribution Tool for Intranets and Corporate Networks, Novell, Apr. 21, 1997. (www. novell.com/press/archive/1997/04/pr97071.html).*
Bruce Schneier, "Applied Cryptography second edition", John Wiley & Sons, Inc., pp. 1-5.*

* cited by examiner

*Primary Examiner*—Kimyen Vu
*Assistant Examiner*—April Y Shan
(74) *Attorney, Agent, or Firm*—Harness, Dickey & Pierce, P.L.C.

(57) ABSTRACT

An apparatus to implement role based access control which reduces administrative expenses associated with managing access in accordance with policies and roles. The apparatus includes a memory storing a first role based access control condition associated with an action and a subsystem executing an enforcement entity and a decision entity. In various forms, the two entities are independent entities. The enforcement entity receives a request for the action from a requestor with a role. Additionally, the enforcement entity communicates the role and the request to the decision entity for the decision entity's decision of whether the role satisfies the first condition. The decision entity then communicates the decision to the enforcement entity. Accordingly, the enforcement entity allows or denies the requester the action based on the decision made by the decision entity.

31 Claims, 9 Drawing Sheets

| POSITIVE POLICIES / NEGATIVE POLICES | NONE APPLICABLE | NONE WITH TRUE CONDITIONS | AT LEAST ONE WITH TRUE CONDITION |
|---|---|---|---|
| NONE APPLICABLE | DENY | DENY | ALLOW |
| NONE WITH TRUE CONDITIONS | DENY | DENY | ALLOW |
| AT LEAST ONE WITH TRUE CONDITION | DENY | DENY | DENY |

FIG. 4

| RBAC ADMINISTRATION | _ □ X |
|---|---|

| FILE | EDIT | HELP |
|---|---|---|

| SYSTEM | DOMAIN | ROLE | RESOURCE | ACTION | :POLICY: | ANALYSIS | AUDIT |

POLICY NAME:
POL-DRIVETANK

POLICY CONDITION ((SYSTEM: HASROLE (SUBJECT, "TANKDRIVER") ||SYSTEM: HASROLE (SUBJECT, "TANKCOMMANDER")) && (LOCATION == "EUROPE"))

ACTION NAME
[DRIVETANK]

⦿ ALLOW  ○ DENY

ACTION ARGUMENTS

| TYPE | VARIABLE |
|---|---|
| STRING | LOCATION |

[ADD ARGUMENT]

POST IT NOTES

[ADD NOTE]

[DONE]

POLICIES WHOSE CONDITIONS ARE IN WORK

FIG. 6

RBAC ADMINISTRATION

FILE   EDIT   HELP

| SYSTEM | DOMAIN | ROLE | RESOURCE | ACTION | POLICY | ANALYSIS | AUDIT |

| PDM LOG | PDP LOG | PEP LOG |

ACTIVITY ANALYSIS

REFRESH VIEW    RESET LOG

```
NOV 26 09:41:31 127.0.0.1 PDP [0]: WAITING FOR CONNECTION ON4434
NOV 26 09:56:39 127.0.0.1 PDP [0]: ACCEPTED CONNECTION
NOV 26 09:56:39 127.0.0.1 PDP [0]: CERT CHAIN
NOV 26 09:56:39 127.0.0.1 PDP [0]: ISSUER C=US, ST=WA, L=BELLEVUE, O=PHANTOM WORKS, CN=CA SERVER
NOV 26 09:56:39 127.0.0.1 PDP [0]: SUBJECT C=US, ST=WA, L=BELLEVUE, O=PHANTOM WORKS, CN=CA SERVER
NOV 26 09:56:39 127.0.0.1 PDP [0]: SERIAL 10001
NOV 26 09:56:39 127.0.0.1 PDP [0]: VALIDITY THU MAY 31 09:38:50 PDT 2001-MON MAY 31 09:38:50 PDT 2021
NOV 26 09:56:39 127.0.0.1 PDP [0]: ISSUER C=US, ST=WA, L=BELLEVUE, O=PHANTOM WORKS, CN=CA SERVER
NOV 26 09:56:39 127.0.0.1 PDP [0]: SUBJECT C=US, O=PHANTOMWORKS.ORG, OU=MCT, CN=JPHN MASTER ADMIN
NOV 26 09:56:39 127.0.0.1 PDP [0]: SERIAL 10138
NOV 26 09:56:39 127.0.0.1 PDP [0]: VALIDITY FRI SEP 13 11:12:19 PDT 2002-SAT JUN 14 21:48:36 PDT 2003
NOV 26 09:56:39 127.0.0.1 PDP [0]: CERT CHAIN END
NOV 26 09:57:32 127.0.0.1 PDP [0]: CLIENT SESSION ENDED
NOV 26 09:57:32 127.0.0.1 PDP [0]: ACCEPTED CONNECTION
NOV 26 09:57:32 127.0.0.1 PDP [0]: CERT CHAIN
NOV 26 09:57:32 127.0.0.1 PDP [0]: ISSUER C=US, ST=WA, L=BELLEVUE, O=PHANTOM WORKS, CN=CA SERVER
NOV 26 09:57:32 127.0.0.1 PDP [0]: SUBJECT C=US, ST=WA, L=BELLEVUE, O=PHANTOM WORKS, CN=CA SERVER
NOV 26 09:57:32 127.0.0.1 PDP [0]: SERIAL 10001
NOV 26 09:57:32 127.0.0.1 PDP [0]: VALIDITY THU MAY 31 09:38:50 PDT 2001-MON MAY 31 09:38:50 PDT 2021
NOV 26 09:57:32 127.0.0.1 PDP [0]: ISSUER C=US, ST=WA, L=BELLEVUE, O=PHANTOM WORKS, CN=CA SERVER
NOV 26 09:57:32 127.0.0.1 PDP [0]: SUBJECT C=US, O=PHANTOMWORKS.ORG, OU=MCT, CN=JPHN MASTER ADMIN
NOV 26 09:57:32 127.0.0.1 PDP [0]: SERIAL 10138
NOV 26 09:57:32 127.0.0.1 PDP [0]: VALIDITY FRI SEP 13 11:12:19 PDT 2002-SAT JUN 14 21:48:36 PDT 2003
NOV 26 09:57:32 127.0.0.1 PDP [0]: CERT CHAIN END
```

FIG. 7

CRYPTOGRAPHICALLY ENFORCED, MULTIPLE-ROLE, POLICY-ENABLED OBJECT DISSEMINATION CONTROL MECHANISM

FIELD

The present disclosure relates to computers controlling access to sensitive objects, and more particularly to computers implementing policy-enabled role based access control.

BACKGROUND

In complex and dynamic computing networks easy but secure access for the users must be provided to the objects accessible via the network. Typically, the users include humans who wish to read or write information or data objects, use resources to accomplish some task, or run application objects. Such widespread information sharing creates a foundation for critical systems such as virtual enterprises and even coalition warfare. Mechanisms allowing the requisite information flow, exchange, and dissemination must preserve the security of the underlying information and provide traceability of all attempts to access the information. Otherwise, the information may be compromised or the resources and applications may be used by unauthorized personnel.

Recently, the National Institute of Science and technology created a role based access control concept to enhance information sharing while preserving security. Briefly, a system implementing role based access control allows access to objects within the system by determining whether the user requesting access to the object is administratively assigned a role permitting such access. If so, the system allows the user access. If not, the system denies the user access.

Unfortunately, roles change rapidly in large, complex projects such as for example virtual enterprises or coalition warfare. A subcontractor on one project may enter competition for additional subcontracts related to the subcontractor's current contractual responsibilities. While before the competition it would have been desirable to share much information with the contractor, sharing too much information during the competition may unfairly impart an advantage to the subcontractor. Accordingly, the competition suffers with attendant inefficiencies and expenses. During coalition warfare, shifting political alliances may necessitate that a heretofore ally be excluded from access to coalition information and resources.

These changes in roles necessitate administrative tracking of the rapidly shifting roles. Moreover, as the roles shift, access control lists must be updated continuously or else the virtual system may be compromised. Additionally, because of the frequency of role changes, some entity must evaluate each request for access to the system against a current role list. Maintaining the currency of the access list thus consumes large resources in the form of administrative departments and actions associated with these activities. Accordingly, a need exists to minimize the overhead associated with role based access control systems.

SUMMARY

The present disclosure provides an apparatus to implement role based access control and reduces administrative expenses associated with managing access in accordance with policies and roles. In various embodiments, the apparatus includes a memory storing a first role based access control condition associated with an action and a subsystem executing an enforcement entity and a decision entity. The two entities are separate entities. The enforcement entity receives a request for the action from a requester with a role. Additionally, the enforcement entity communicates the role and the request to the decision entity for evaluation of whether the role satisfies the first condition. The decision entity then communicates the decision to the enforcement entity. Accordingly, the enforcement entity allows or denies the requestor the action.

The present disclosure further provides a method to implement role based access control and reduces administrative expenses associated with managing access in accordance with policies and roles. The method includes storing a first role based access control condition and separating a decision entity and an enforcement entity from each other. Thereafter, the enforcement entity receives an access request from a user having a role. Then, the enforcement entity communicates the role and the request to the decision entity. In turn, the decision entity determines whether the role satisfies the first rule based access control condition and communicates the determination to the enforcement entity. Accordingly, the enforcement entity allows the user access based on the role.

In yet other embodiments, the present disclosure provides a computer to implement role based access control. The computer includes a memory and a logic subsystem. The memory stores a role based access control condition in a policy engine. The logic subsystem executes an enforcement entity and a decision entity separately. The enforcement entity receives access requests for an object from a user who has a role. In turn, the enforcement entity communicates the role and the request to the decision entity. Then, the decision entity determines whether the role satisfies the condition by accessing the policy engine. The decision entity then communicates the determination to the enforcement entity which then allows the user access based on the determination.

In another form, the present disclosure provides a computer network within which to implement role based access control. The network includes a memory that stores a role based access control condition and multiple pairs of processors. A first processor of each pair executes an enforcement entity that receives action requests from users having roles. The second processor of the pair executes a decision entity to which the enforcement entity communicates the roles and the requests to the decision entity. Then, the decision entity decides whether the role satisfies the condition and the enforcement entity allows the user the action if the decision entity decides that the role satisfies the condition. In distributed computing applications, multiple enforcement processors can pair-up with a single decision processor to execute one authorization system.

In another form, the present disclosure provides a method of providing role based access control. The method includes programming a decision entity and one, or more, separate, or independent, enforcement entities. The enforcement entity program provides for the enforcement entity to receive an action request from a user having a role. Additionally, the decision entity program provides for the decision entity to receive the request and the role from the enforcement entity and to decide whether the role satisfies a role based access control condition. The enforcement entity program also provides for the enforcement entity allowing the user the action if the decision entity determines that the role satisfies the first condition.

The features, functions, and advantages can be achieved independently in various embodiments of the present disclosure or may be combined in yet other embodiments.

BRIEF DESCRIPTION OF THE DRAWINGS

The present disclosure will become more fully understood from the detailed description and the accompanying drawings, wherein:

FIG. 4 is a truth table in accordance with the principles of the present disclosure;

FIG. 6 is another exemplary graphical user interface in accordance with the principles of the present disclosure;

FIG. 7 is another exemplary graphical user interface in accordance with the principles of the present disclosure;

Corresponding reference numerals indicate corresponding parts throughout the several views of drawings.

DETAILED DESCRIPTION

The following description of various embodiments is merely exemplary in nature and is in no way intended to limit the disclosure, its application, or uses.

The System in General

Figure 1:
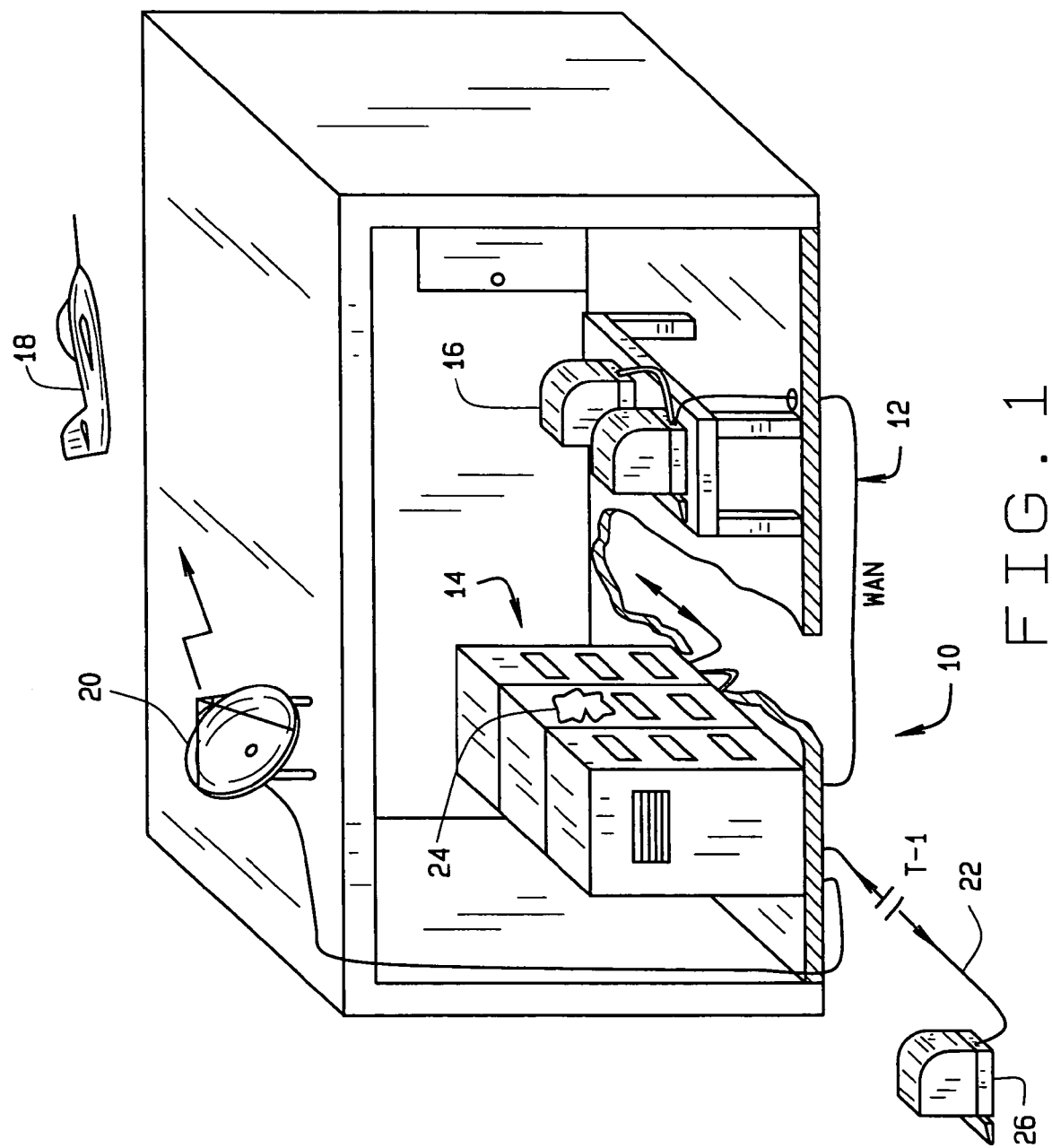
FIG. 1 is a perspective view of a system in accordance with the principles of the present disclosure.

With general reference to the figures and FIG. 1 in particular, an exemplary system 10 incorporating the present disclosure is illustrated. The system 10 forms a communication center that includes a network 12, that may be a wide area network (WAN), connecting various servers and telecommunications devices 14 to a number of computers 16. Additionally, the network 12 may extend to remote locations or devices 18 via electromagnetic communication devices such as fiber optic or radio links 20. In addition, the network 12 will typically connect to a WAN, such as the Internet, via a T-1, or other communications link 22. At least one of these devices will contain some resource 24 which the organization owning the network 12 wishes to protect from unauthorized access. Moreover, the system 10 itself, or any of the components 12-20 thereof, may be the protected resource.

Frequently, an unauthorized device 26, or user, will attempt to gain access to the protected resource 24. The attempt could be completely innocent as when a clerk for the organization accidentally tries to read sensitive data being received from the remote device 18. On the other hand, the attempted access could be considerably more malicious as when an embezzler attempts to access an electronic check writing application on one of the computers 16 to write himself/herself a check. Hackers, espionage agents and the like represent other malicious, unauthorized users. While password protection and encryption techniques have provided a degree of protection for the resources 24 in the past, rapid change associated with large organizations has created a need for an improved role based access control scheme for the system 10.

Briefly, the system 10 makes use of a policy-enabled role based access control (RBAC) system that controls access to objects (e.g. applications, programs, or devices) based on the administratively assigned role(s) of the requestor and the policies that specify the role's entitlement. For example, access to certain engineering documents within a virtual enterprise might be limited to those with the role of "mechanical engineer". Thus, the entitlement for access to certain objects is assigned to roles rather than individuals. These roles are then assigned to users or other end-entities who may need access to the protected object 24. Accordingly, the present disclosure provides systems and methods to implement an improved role based access control scheme.

Figure 2:
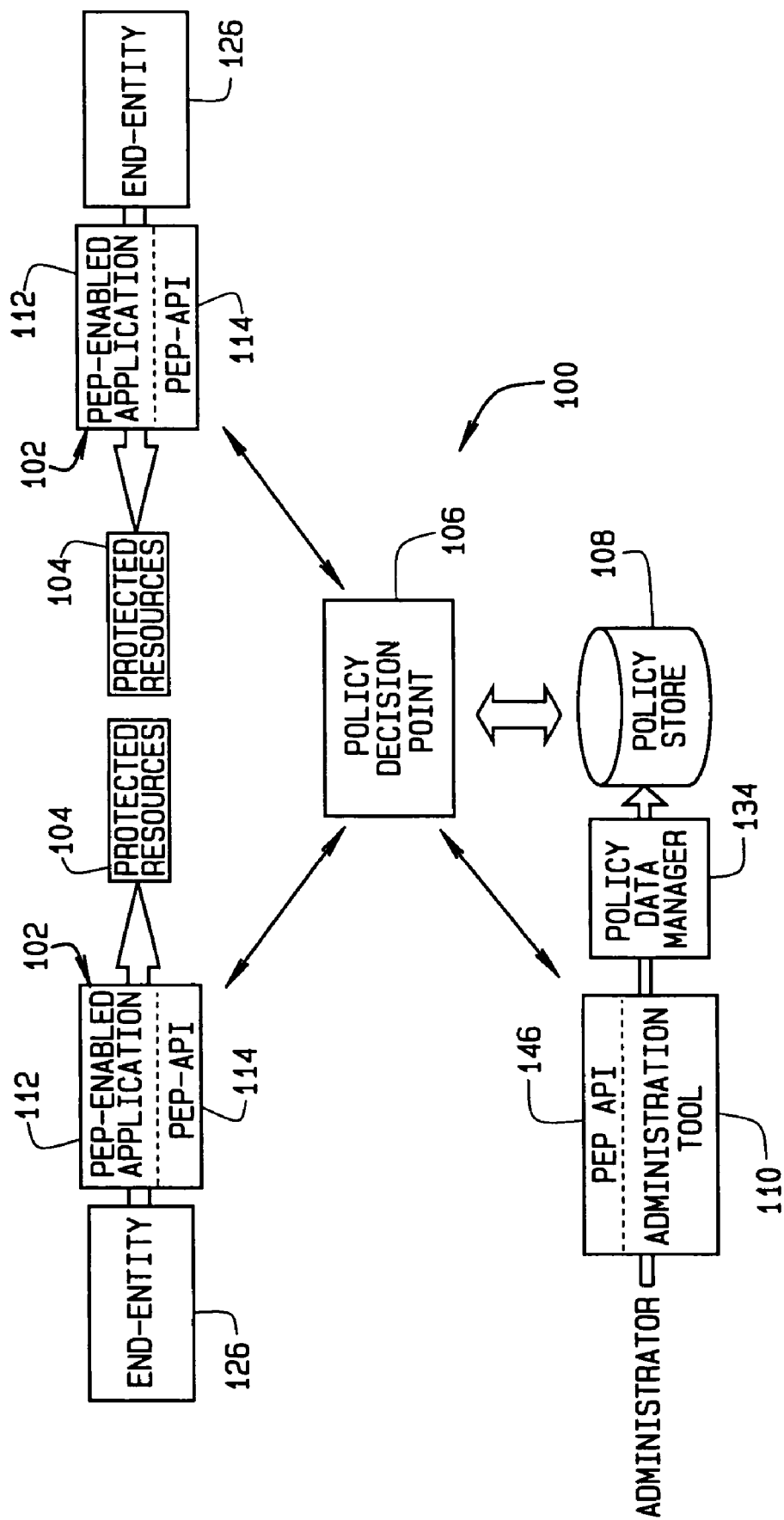
FIG. 2 is a block diagram of various embodiments of the present disclosure.

FIG. 2 illustrates the architecture of various embodiments of the role based access control system, 100 of the present disclosure. The system 100 generally includes a policy enforcement point or entity 102, a protected object or resource 104, a policy decision entity 106, a policy store 108, and an administrative tool 110. The enforcement entity 102 may include, or may form an application program 112 that performs actions on behalf of the user. As will be described herein, the system 100 allows for the creation and management of access policies. Additionally, the system provides for the evaluation of those policies in response to access requests and enforces the policies based on the evaluation.

Figure 3:
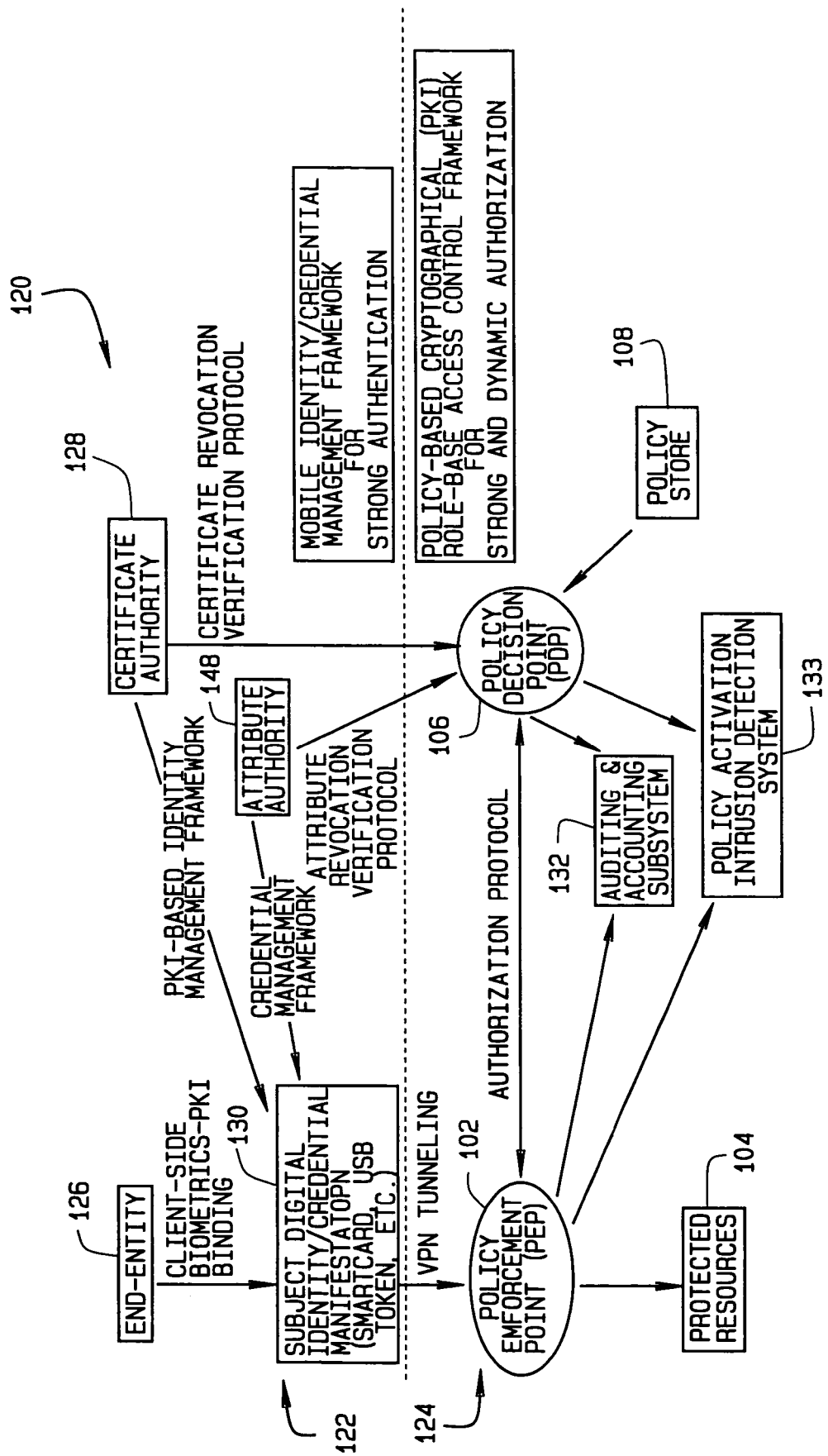
FIG. 3 is a block diagram of other various embodiments of the present disclosure.

As illustrated in FIG. 3, each end-entity 126 interfaces directly, or indirectly, with an enforcement entity 102 by presenting its identity certificate 130 and perhaps an attribute certificate, and by making requests to the enforcement entity 102 for an action requiring access to a resource 104. In turn, the enforcement entity 102 communicates the request and the role of the end-entity 126 to the decision entity 106. The decision entity 106 reads the policy store 108 and evaluates the access request based on the relevant policies. Afterward, the decision entity 106 returns a "yes" or "no" decision to the enforcement entity 102.

In particular, the decision entity 106 uses the end-entity's 126 role and the identity of the requested resource 104 in evaluating the policy. If the enforcement entity 102 receives authorization from the decision entity 106, the enforcement entity allows access to the resource 104 by the end entity 126. Otherwise, the enforcement entity 102 denies the end-entity 126 access to the resource 104. As will be seen after a detailed discussion of the various entities and components shown in FIGS. 1 to 3, the present disclosure enables static applications to exhibit dynamic behavior, as policies change over time, by separating authorization enforcement from the authorization policies.

The Policy Enforcement Entity

Generally, the enforcement entity 102 includes software components 112 that are responsible for enforcing access control policy. Thus, the enforcement entity 102 manages the protected resource 104, access to it, and actions that may be performed upon (or with) it. The actions (and the resources 104 to which they apply) are defined by the application 112. The application 112 may be a component of the enforcement entity 102. In effect, the enforcement entity 102 requests access by asking the decision entity 106 questions such as: "Can this subject perform this specific action on this specific resource;" and "What are all the resources of this particular type on which this subject can perform this specific action?"

Additionally, as noted in FIG. 3, the enforcement entity 102 may also engage in a secured dialog with the decision entity 106 to determine authentication and authorization as will be explained in more detail herein. By writing to an audit log server 132, the enforcement entity 102 may also log the users' 126 access requests. Additionally, a policy activation and intrusion detection system 133 may examine the access requests to determine who might be attempting to access the protected resources and which policies are actively being used. Note, moreover, that any software component can be turned into an enforcement entity 102 if it calls the methods and functions to check authentication and authorization provided by the present disclosure. In one embodiment of the present disclosure, the enforcement entity 102 bindings are provided in the Java and C programming languages.

In another embodiment, the enforcement entities 102 are located at "choke points" in the software to trap and check authorization for all actions that need to be controlled with role based access control. A "choke point" can be located in a single location or a plurality of choke points may be distributed throughout an application 112 or system 100. Choke points typically exist at locations where all controlled actions can be authorized, or checked. For example, if the enforcement entity 102 is a J2EE Application Server, there exists in the server a central authorization choke point that can be augmented so that the Application Server becomes an enforcement entity. In the alternative, if the enforcement entity 102 is a web server, the choke point can be created with CGI scripts, Java servlets, and the like.

Where the enforcement entity 102 comprises an application program 112, as in FIG. 2, the application developer will typically ensure that actions requiring protection have the appropriate authorization checks. For applications 112 or systems 100 with sufficiently high information assurance requirements, the application 112 may be certified to make sure that all protected actions require authorization. Furthermore, once the application 112 has been certified the application 112 may also be protected from malicious changes. For instance, the application 112 may be burned into a software token such as the Java I-Button or a similar device.

Enforcement Entity Application Program Interfaces (APIs)

Turning now to the APIs within the enforcement entity 102, there are generally two interfaces included in a particular enforcement entity 102. The first API (not shown) exists between the end user and the application 112. Thus, the first API may be conventionally secured and created via Java and C bindings.

Meanwhile, the second API 114 enables the application 112 to communicate with the decision entity 106. It should be noted herein that "enforcement enabling" an application 112 means inserting calls to the API 114 at appropriate points where actions need authorization. Thus, the second API 114 exists between the application 112 of the enforcement entity 102 and the decision entity 106. In accordance with various embodiments of the present disclosure, the developer of the second API 114 defines it so that the application 112 and other software components can be written in any of the applicable programming languages. While a Java version of the enforcement-enabling API 114 is described in more detail herein, the C version is analogous to the JAVA version.

Formatting of messages between the enforcement and decision entities 102 and 106 may be encoded using XML. Moreover, the messages may be encoded in the SAML and XACML standards. In various embodiments, the messages are encoded in ASCII, and conform to a grammar specified in the YCC and LEX formats. Additionally, the present disclosure provides keywords to signify authorization requests and responses, return error codes, and to end a session. For the administrative tool 110 (that is an enforcement entity 102 to be discussed in more detail herein), the present disclosure also provides a keyword to denote the start of a publication of a new policy.

The Policy Decision Entity

With reference to FIGS. 2 and 3, the decision entity 106 accepts access requests from the enforcement entity(s) 102, evaluates them against current policy, and returns "yes" or "no" access decisions. In various embodiments, a centralized decision entity 106 may make all access determinations for the system 100. In other embodiments, though, multiple decision entities 106 may decide whether the users 126 may access the protected resources 104. As will be seen, the decision entity 106 treats policies, actions and roles as resources similarly, in that policy controls access to these objects.

Typically, the decisions returned by the decision entity 106 are in the form of a Boolean variable (e.g., true or false). More extensive, detailed, and non-Boolean returns, however, are also possible (e.g. "the user may use the resource for 5 minutes). The decision entity 106 may log all transactions made to an Audit and Accounting Server 132. (See FIG. 3).

The policy decision entity 106 may also have the ability to execute actions in evaluating conditions specified by the policies. Often, these actions will require that the decision entity 106 gain access to policy protected resources 104. The actions generally take the form of attribute lookups such as retrieving the domain of a resource 104 or the roles of the end entity 126 (e.g. the authorized user). Other examples of these actions include looking up environmental data such as time or location and requesting that the enforcement entity 102 perform various actions (e.g., "look up the user's 126 GPS coordinates" or "tell me your local time").

The Protected Resource

The resource 104 may be a database record, a missile launcher, an object, or anything else that is important to the application 112 or the organization that owns or controls the system 100 of FIGS. 1 to 3. In object-oriented programming terms, a resource 104 is much like a class in that it has a name, has a set of named attributes, and can be instantiated. Moreover, users 126 apply actions to the resource 104. From the point of view of the application 112, these actions include any operation that the organization requires authorization for access thereto.

The Policy Store and Policies

Turning now to the policy store 108, the policies the decision entity 106 evaluates may be stored in the form of statements in a policy "language" that will be described in more detail subsequently. The police store 108, or engine, parses these individual policy statements into an internal representation more useful for combination into a coherent overall set of policies. Then, the decision entity 106 uses the resulting internal representation for the efficient rendering of authorization decisions.

Each policy helps control access to an action with some actions having several policies controlling access thereto. Additionally, each policy generally contains one or more condition expressions that determine whether access may be granted. A condition expression may refer to attributes or arguments of the requested action, attributes of the user 126, roles held by the user 126, or elements of the user's environment such as location or time. Moreover, policies may be "positive" or "negative". A "positive" policy allows access when its condition is true. In contrast, a "negative" policy prohibits access when its condition is true. Moreover, negative policies take precedence over positive policies. If a particular action has no policy with a true condition, access is denied by default, in various embodiments of the system 100.

In yet another embodiment, the overall set of policies is stored in two files in the policy store 108. One file is for the system related policies that govern policy administration and the other file is for application related policies. The system policies are envisioned as being relatively static (though they may be dynamic). Accordingly, an automated mechanism may be provided for updating them. In contrast, the file containing the application policies is envisioned as being dynamic (though it may be static). Therefore, the application file may carry a version number to allow tracking of policy modifications. When the decision entity 106 starts up it loads the system policies and the current version of the application policies and then awaits the first end entity 126 access, or action, request.

When an access request arrives from a client 126 (or user), the decision entity 106, also referred to herein as the policy decision point, first looks up the policies controlling the requested action by communicating with one or multiple policy stores 108. If there is no applicable policy, the request is denied. Otherwise, the policy decision point 106 combines policies according to the following rules. If the condition on any negative policy is true, the request is denied. Then, if the condition on any positive policy is true, the request is granted. Finally, if the requested action is neither prohibited by a negative policy nor allowed by a positive policy, the request is denied. FIG. 4 illustrates these rules in a truth table 107.

The Policy Language in General

Turning now to the policy language provided by the present disclosure, the policy language provides representations for the types of resources 104 to be protected; the roles that may be assigned to the users 126; the actions that may be applied to the resources 104; and the conditions under which the actions may be applied. It should be noted that the National Institute of Science and Technology (NIST) reference RBAC implementation defines actions simply in terms of HTTP protocol operations on a URL. Notably, the NIST implementation does not define a language for policies.

Likewise, most commercial RBAC systems incorporate the NIST model and merely extend it to the methods on an object in a J2EE application server. While at least one commercial system defines actions as named sets of keyword/value pairs, it has no mechanism for describing the types of resources to be acted upon. That system also makes no distinction between users and roles.

Policy Language Related Definitions

Before discussing the policy language in greater depth, certain definitions may be helpful. For instance, an object is a named entity defined by policy. Likewise, policies, domains, resources, subjects, and actions may be referred to as objects. A "domain" is an abstraction that can contain objects, such as resources, subjects, actions, policies, or roles, with qualified object names being prefixed by the object's domain. Moreover, the policy language may provide for domain inheritance.

Further, a "resource" is a named asset that is protected by policy that resides in a domain, and that has typed attributes. In the policy language, defining a resource is roughly equivalent to defining a type. In various embodiments, the language also provides for resource inheritance.

A "user" is a named entity in a domain that may perform actions subject to policy. A user is usually a person. In contrast, a "role" is a special case of an attribute that is assigned to one or more users based on his or her function in the organization. Thus, outside third parties are not users. At times, though, these third parties may attempt to access the protected resources of the system. Since they have no assigned role, the third parties will be denied access accordingly. Thus, for the present purposes, these third parties may be treated as users having no valid role.

Roles are defined by policy, may be inherited from other roles, and can be domain-qualified. In the alternative, roles may be carried in attribute certificates on hardware tokens, in a lightweight directory access protocol (LDAP) directory, mapped to the users, or assigned by other mechanisms.

Additionally, a "condition" is a Boolean expression involving attributes of a user, or resource, and other variables such as location or time. The language provides for arbitrarily complex conditions, including nested function calls. An "action" is a named, application-dependent operation that a user may perform on a resource (or resources), subject of course to policy. Note that actions can exist in domains. While the policy language must know the object type(s) on which an action operates, the application defines the implementation of the actions.

Continuing with the definitions, a "policy" is a named expression containing at least one condition and is associated with an action. Policies can live in domains, may contain a list of application-defined "tags", and may even be digitally signed. Meanwhile, "tags" are a mechanism for the policy writer to alter the behavior of an action. Typically, tags are implemented as a list of strings that the decision entity sends back to the enforcement entity in addition to the access control decision. Policy tags may be used to implement workflow, control document encryption, and enforce audit logging, among other functions.

Finally, an "attribute" is a named characteristic of a subject or resource that can be queried during the evaluation of policy. Actions may be defined to look up the values of attributes contained in policy conditions, but the names and types of resource attributes are defined by the application.

The Policy Language and Policies

In general, the policy language allows for the effective separation of policy enforcement and decision functions. For example, policies written in the language prohibit a user 126 from holding both a "can sign checks" and a "can write checks" roles. Alternatively, the policies can prevent a user 126 with the ability to write policy (an administrator) from granting himself access to non-policy resources. Initially, the policies controlling how to administer the system may be pre-defined by the system architect. Likewise, the initial policies controlling application 112 behavior may be pre-defined by policy administrators associated with the application 112 developers.

Those skilled in the art will appreciate that the language has no block structure. Thus, policy statements may appear in any order. Accordingly updating the policies is simplified since new policy statements may be made at any location. Such updates will normally be accomplished through an administrative interface rather than by direct manipulation in the policy store 108.

Domains may also be used to separate system (or core) policy and application specific policy. Accordingly, the "system" domain may contain the system policy (which controls administrators' privileges) and the "system.root" domain may contain application-specific policy created by the administrators. Unqualified names in policy statements may be assumed to be application policies in the system.root domain. Thus, all policy objects in the policy store 108 may be associated with (or "owned" by) domains. Accordingly, each domain administrator role may be associated with a domain with its access authority restricted to policy store 108 elements therein.

Sub-domains may also be used to segregate various categories of policies (e.g., system 100 and application 112 related policies). By default, the authority of the administrator for that sub-domain (or domain) may be restricted to access of application specific objects within the administrator's sub-domain. The master administrator, however, may have the ability to "extend" the scope of authority of any domain administrator to include not only their own domain but also all domains below it.

Actions

Turning now to a discussion of actions, the decision entity 106 treats requested actions similarly to function calls. Thus, requested actions may have names, typed return values, and typed arguments. In response to an enforcement entity 102 query regarding a particular action, the decision entity 106 looks up the policies controlling the requested action, evaluates the condition expressions therein, and returns the result. The values and arguments returned in response to an action request can be resource names or primitive types such as "int" or "string".

Note that since a policy may contain a call for an action (e.g., "access a protected object and retrieve information therefrom") the actions called within a policy may also be controlled by policy. Accordingly, the policy engine 108 may recursively call itself when it encounters an action inside a policy condition. It is therefore possible for a user 126 to be denied access because the user 126 lacked sufficient authorization for the decision entity 106 to evaluate the policy controlling the action. In one embodiment, the decision entity 106 does not return an explanation for the access denial when a recursive call returns a denial. From the user's 126 perspective, access simply appears to have been denied. In another embodiment, the decision entity 106 returns an explanation when it denies access. Of course, the ability of the decision entity 106 to return an explanation (which is an action related to the policy) may also be controlled by policy.

Frequently, an authorization request can be immediately answered by a decision entity 106. However, the condition of a policy may require that the enforcement entity 102 perform one or more actions (e.g., "look up the user's GPS coordinates") for the decision entity 106. Before passing the required action to the enforcement entity 102 for subsequent execution, the decision entity 106 recursively checks to see that the user 126 is authorized to perform this secondary action. If authorized, the decision entity 106 passes the (secondary) action and its arguments to the enforcement entity 102 for execution. Once the enforcement entity 102 has executed the action, the enforcement entity 102 returns the result so that the decision entity 106 can answer the original authorization request.

The Administrative Tool

As noted earlier, an administrative tool 110 may be included in the system 100 (as shown in FIG. 2) to allow system administrators to manage the system 100. In various implementations, the administrative tool 110 is implemented as an enforcement entity protecting access to a protected resource 104 that includes the policy store 108 and the policies stored therein. Accordingly, a positive policy stored in the policy store 108 allows users having administrative roles access to the policies stored in the policy store 108.

Figure 5:
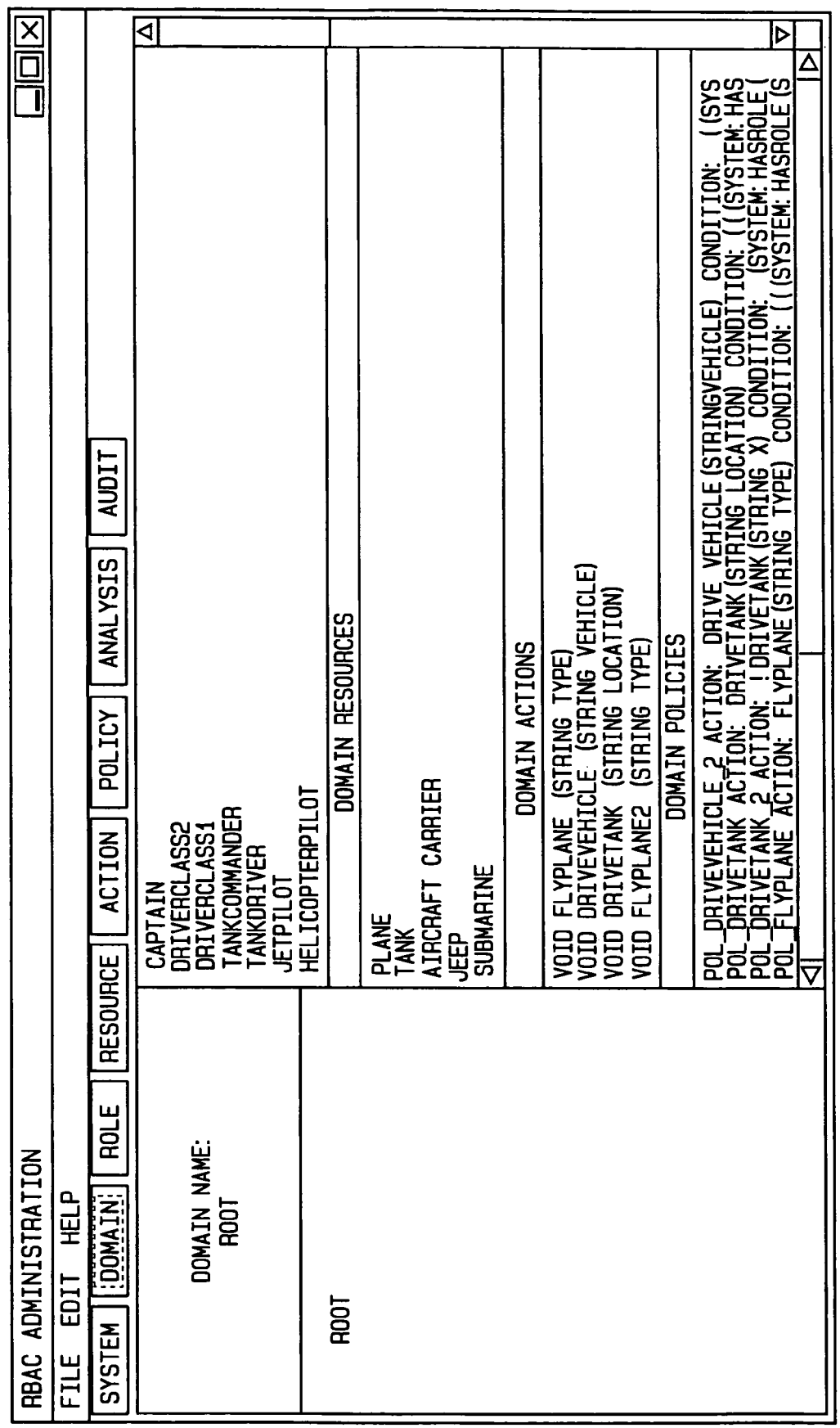
FIG. 5 is an exemplary graphical user interface in accordance with the principles of the present disclosure.

A graphical user interface (GUI) of the administrative tool 110 may present a number of tabs representing the functions performed by administrators, such as managing policy store elements (e.g., domains, roles, role maps, resources, actions, and policies), setting system configuration parameters, managing audit logs, and analyzing policies. FIGS. 5 to 7 present some exemplary graphical user interface screens. In particular, FIG. 5 shows a GUI 140 used to view all the policy store elements (roles, resources, actions, policies) in any domain. Similarly, FIG. 6 shows the GUI 142 used to add or modify policies. Additionally, FIG. 7 shows a GUI 144 used to manage log files from the administrative tool 110, a policy data manager 134, and the decision entity 106 of FIG. 2.

The API 146 for an administrative tool 110 may include a protocol for uploading a new version of the application policy file into the decision entity 106. When such an update occurs, the decision entity 106 stores the policy update in a new file, increments the current version number, and attempts to parse the new policy. If the decision entity 106 parses the updated policy successfully, the decision entity 106 commits the new version as the current version. Thus, all subsequent access requests from the users 126 become subject to the updated policy. On the other hand, if parsing of the updated policy fails, the decision entity 106 discards the update and retains the prior version of the policy.

In another embodiment, the administrative tool 110 and the decision entity 106 start out with identical copies of the application policy file. If more than one administrative tool 110 sends updates to the decision entity 106 or if the application policies are manually edited in the decision entity 106, the policy data manager 134 arbitrates the potentially conflicting changes and coordinates policy updates with the decision entities 106. Note that the policy language is also used to write policies to control the writing of new policy. Thus, the administrators of the system 100 responsible for these policy updates are also bound by the policies of the system 100.

Therefore, access to the administrative tool 110 is policy-based and assigned to roles rather than to individuals. Moreover, administrative duties are divided such that no one person has complete control of the system 100. Further, policies associated with the administrative tool 110 ensure that no single administrator can augment his or her own authority, thus gaining complete control of the system 100. Alternatively, for systems 100 with less stringent security requirements, the administrative tool 110 may give full administrative privileges to a single person. Moreover, policies associated with the administrative tool 110 may support distributed management, allowing "local" control of policies by organizations that "own" the protected resources 104.

Additionally, because the administrative tool 110 is an enforcement entity 106, the system 100 keeps a detailed, tamper-proof audit trail of all administrative accesses by logging access requests. Since administrator privileges are policy controlled, the administrative tool 110 is implemented as an enforcement entity. Thus, the administrative tool 110 requests authorization from the decision entity 106 for each change requested by an administrator and may permit the change or may display an error.

Thus, while ordinarily policies control access to application 112 specific protected resources 104 (e.g., documents or Web pages), in the case of administrative roles, the protected resources 104 are the policy store 108 elements themselves (i.e., roles, resources, actions, policies). Accordingly, using the system 100 to control access by administrators makes the system 100 extremely flexible thereby allowing customization of the system 100 to suit its organizational or operational requirements. Moreover, based on the requirements of the system 100, the types of administrators (i.e., their administrative roles) and the individual privileges flowing from those roles can be determined at implementation time and defined in the policy store 108 without the necessity of making any changes to the software. Thus, significant cost benefits may be realized, even with future commercial-off-the-shelf (COTS) products if they include enforcement entities 102 thereby enabling quick integration into the enterprise management model.

Turning now to the initialization of the system 100, the administrative roles are generally initialized first. Because an attribute authority 148 issues an attribute certificate for each administrator, initializing the administrator role is not an issue if the system 100 uses attribute certificates to map roles to users. However, if the system 100 is to perform role mapping in the policy store 108, then the initial master administrator role is mapped at installation time. An installation utility (not shown) may prompt the installer for the location of the PK certificate of the initial master administrator and then may make a map entry in the policy store 108 defining this user as a master administrator. In such an embodiment of the system 100, policies associated with the administrative tool 110 may ensure that the master administrators never remove all master administrator role maps. Otherwise the ability to thereafter create, modify, or delete administrator roles might be impeded.

The Policy Data Manager

The policy data manager 134 may handle all modifications to the policy store 108, may handle currency control and transaction management of the policy store 108, and may notify the decision entities 106 when the policy store 108 has been updated. Thus, when an administrator has completed a set of authorized changes and requests to publish them, the administrative tool 110 sends the publish request to the policy data manager 134. In turn, the policy data manager 134 may then commit the changes to the persistent data store 108, and broadcast the changes to any active decision entities 106. Having completed the publication, the policy data manager 134 may then return an indication of the completed status of the publication to the administrative tool 110. Also, the policy data manager 134 may log all changes made to the policy store 108.

The administrative tool 110 and the policy data manager 134 of FIG. 2 may be implemented as a single Java Swing application. Moreover, the policy data manager 134 may be implemented in a separate Java package, particularly if the policy data manager 134 will be implemented as a separate server process.

In one embodiment of the present disclosure, the policy data manager 134 handles concurrently control and transaction management of policy updates. The integrity of policy update transactions are maintained here to prevent inconsistent and concurrent updates from multiple administrators. Policy data manager 134 also performs policy update notification to administrators.

Security and Authorization

System 100 of FIG. 3 may also provide a framework 120 utilizing credential management to enhance system 100 security and protection of the resources 104 as shown by FIG. 3. Generally, a portion 122 represents one or more users 126 and a credential management infrastructure 128. The credential management infrastructure 128 includes the Public Key Infrastructure (PKI) that manages identity certificates 130, and the Attribute Authority (AA) 148. Of course the attribute authority 148 may manage Attribute Certificates (ACs) 130 that binds the role of the user 126 to the user 126. In the alternative the role binding attribute certificates 130 may be stored in a central repository (not shown) where the decision entity 106 accesses them as needed. The remaining portion 124 of the framework 120 represents the components previously discussed.

In accordance with various embodiments of the present disclosure, additional security may be provided by using X.509 Public Key Certificates (PKCs) that are managed by a PKI to authenticate the identities of the users 126. Roles are bound to the authenticated identities with X.509 Attribute Certificates (ACs) managed by the Attribute Authority 148.

Thus, in various embodiments, users authenticate themselves by presenting an X.509 identity certificate. The enforcement entity 102 accordingly secures the client side of a bi-directional Secure-Socket Layer (SSL) connection to the decision entity 106 in the case of web-based application. The decision entity 106 uses its own server certificate to secure its end of the connection. Once a connection is established, the identity of the user 126 is therefore known with certainty by the decision entity 106. Then, the decision entity 106 may look up the user's roles in its local copy of the policy database 108. This role lookup may happen at session startup and again for each decision request. One advantage enjoyed by the present embodiment is that if it becomes necessary to completely revoke a user's privileges, the associated identity certificate may be revoked by the Certificate Authority 128 that issued it. It should also be noted that the authentication framework and its channels are not limited to web-based nor SSL connecting as discussed. Rather, the foregoing discussion simply illustrates an exemplary embodiments.

To begin creating an enforcement-enabled application 112 in an object-oriented programming environment, the developer generally begins with an instance of an enforcement entity 102 class. Then, a method is provided to identify the root certificate of the Certificate Authority that issued the decision entity's 106 server certificate. To begin a session, a method is invoked which provides the user's identity certificate. In addition, a set of attribute certificates can be specified to identify the roles of the users 126. Once the session has begun, a method is provided for asking about authorization for performing an action on some set of resources 104. In addition, methods are provided for encryption/decryption, and logging the completion of actions carried out by the enforcement entity 102. Each of these methods may raise various types of exceptions (e.g., identity certificate has been revoked, authorization request for unknown action, etc.).

Thus, users 126 may be authorized (or not) to perform actions based on the roles they hold and the policies governing the actions. Roles and the mappings of roles to individual users may also be revoked. In various embodiments, a role (or role mapping) may be revoked by altering or deleting the appropriate policy in the policy store 108. Accordingly, the revocation takes effect immediately. Of course, role revocation may also take place in an attribute authority by verifying an attribute certificate and then checking the appropriate revocation list.

With reference still to FIGS. 2 and 3, in other various embodiments, the decision entity 106 may have a mechanism that allows an enforcement entity 102 to act as a proxy for third-party users. For example, the enforcement entity 102 may be installed in a web server. The enforcement entity 102 authenticates a single connection to the decision entity 106 using its own certificate. Users at remote browsers then make SSL-secured connections to the enforcement entity 102 enabled web server using their own identity certificates. The enforcement entity 102 may then pass the certificate of a connected user to the decision entity 106 for use in policy decisions.

In yet other various embodiments, an encrypted channel such as bi-directional Secure-Socket Layer (SSL) connection can be used to secure the dialog between the enforcement entity 102 and the decision entity 106. Thus, the SSL session encrypts all communication (between the enforcement and decision entities) going over the socket. On the enforcement entity 102 side of the SSL connection, an identity certificate identifying the application user is used. On the decision entity 106 side, an identity certificate identifying the decision entity server machine is used. The decision entity server certificate is signed by a Certificate Authority 128 that the enforcement entity trusts. In this way, the enforcement entity 102 has higher assurance that it is talking to a valid decision entity 106.

Moreover, interactions between enforcement and decision entities 102 and 106 exist within the context of a session. In the web context, establishing the SSL connection referred to above begins the session. Doing so establishes the user's identity for the context of the session. Within that session, authorization checks are requested by the enforcement entity 102. While identity authentication is established at the beginning of a session, the user's roles may be authenticated upon each individual authorization request. Ending a session involves stopping the SSL connection. An enforcement entity-enabled application 112 may also start multiple sessions with a particular decision entity 106, and each may have a different user 126 authenticated. Other session-oriented communication protocols are also applicable here.

Generic Syntax

With the various components of the system now described, a typical authorization request interaction may now be described in more detail. Generally, both the action name and arguments are passed from the enforcement entity 102 to the decision entity 106. If an argument is non-primitive (i.e., not an integer, float, Boolean, or string), then a mechanism is provided to serialize (turn it into a form that the decision entity can handle) the argument. In various embodiments, that format is in the form of attribute-value pairs.

When the decision entity 106 access the policy store 108 it finds a policy list that consists of a list of policy statements. The following section describes the constructs of these policy statements in the BNF (Backus Naur Form) format.

```
<policy_list> ::= <policy_statement>
        | <policy_list> <policy_statement>
```

In turn, the policy statements may define policies, roles, resources, actions, or domains in statements such as:

```
<policy_statement> ::=   <policy_def>
        |        <role_def>
        |        <resource_def>
        |        <action_def>
        |        <domain_def>
```

While domains are defined simply as:

```
<domain_def> ::=     Domain: <domain> ;
<domain>      ::=<word>
        | <domain> . <word>
```

Moreover, a domain name generally has global scope and may be defined exactly once as:

```
Domain: system;
Domain: system.root;
    Also, roles are defined as:
    <role_def> ::= Role: <qualified_name> ;
    <qualified_name> ::=    <word>
    |<domain> : <word>
```

A domain-qualified role name has global scope and may be defined exactly once.

Note also that roles may be mapped to the various users in the policy store 108. In the absence of an attribute authority (as discussed previously), roles may be mapped to subject identities via role map statements written in the policy language. Role mapping statements have the following syntax:

```
<mapping_def> ::= Map: Id: ( <issuer_dn> , <serial> , <user_cn> )
        Role: <qualified_name> Time: <string>
        <opt_revoked> ;
```

Where the <issuer_dn> token is a string containing the distinguished name of the certificate authority that issued the user's certificate. The <serial> token is a string containing the serial number of the user's certificate. The <user_cn> token is a string containing the user's common name from the certificate. These three fields uniquely identify the subject user, who is then assigned the role named by <qualified_name>. The purpose of the Time: <string> clause is to record the time of creation or revocation of the mapping. In one embodiment, the Time: <string> clause is not used. The <opt_revoked> token may either be null or the string "revoked" to signify that the mapping has been revoked.

Resources are defined by a qualified name:

<resource_def>::=Resource: <qualified_name>;

A resource definition is logically equivalent to a type or class declaration in a programming language. Domain-qualified resource names generally have global scope and may be defined exactly once. Unqualified resource names may be assumed to be in the system.root domain.

An action is defined by a type, a qualified name, and an argument list, such as follows:

```
<action_def> ::=       Action: <action_type> <array_tag>
                       <qualified_name>
                       <attr_list> ;
<array_tag> ::=
                    |    [
<attr_list>  ::=      ( <pair_list>
<pair_list>  ::=
                    |    <attr_type> <array_tag> <attr_name>
                    |    <pair_list> , <attr_type> <array_tag>
                         <attr_name>
<action_type>   ::=      <qualified_name
<attr_type>  ::=      <qualified_name
<attr_name>  ::=      <qualified_name>
```

Note that action return values can be named resources or fundamental types. Also, actions may return multiple values of a type, signified by the "[ ]" token and have domain-qualified names. An action may take zero or more arguments of specified types. A typical action argument would be the resource to which it applies. However, action arguments may also be one of the fundamental types: integer, float, string, and Boolean. Additionally, action return types may be void.

A domain-qualified action name with its list of argument types has global scope. Moreover, it is possible to define two actions with the same name and different argument types. Note that attempting to define two actions with the same name and argument types but with different return types will likely cause unreliable performance. The <attr_name> tokens in an action's argument list behave like formal parameters in a function call. Accordingly, using the same name for the arguments of different actions is allowed, since these symbols have scope local to a policy statement.

Although not needed in a check writing authorization example to be discussed shortly, an action returning a multi-valued result can have the following syntax:

Action: Check [] Lookup_Checks_To_Payee (string payee);

Generally, policy definition statements may follow a format such as:

```
<policy_def>   ::=   Policy: <qualified_name> <condition> <action>
                     <postit> ;
<action>       ::=   Action: <opt_not> <qualified_name> <attr_list>
<opt_not>      ::=
               |     !
<postit>       ::=
               |     Tag: <attr_list>
```

Thus, a policy is a named statement specifying a condition that applies to an action with an optional list of tags. The optional "!" tag in the <action> clause may denote a negative policy. Domain-qualified policy names may have global scope and may be defined exactly once in the following format.

```
<condition>   ::=   Condition: ( <cond_expr> )
<cond_expr>   ::=   <bool_expr>
              |     ( <cond_expr> )
<bool_expr>   ::=   <rel_expr>
              |     <unary_op> ( <bool_expr> )
              |     <bool_expr> && <bool_expr>
              |     <bool_expr> || <bool_expr>
              |     ( <bool_expr> )
              |     <set_expr> ( <bool_expr> )
<rel_expr>    ::=   <primary>
              |     <primary> <rel_op> <primary>
              |     ( <rel_expr> )
<primary>     ::=   <attr_expr>
              |     <literal>
              |     ( <primary> )
```

Thus, conditions are Boolean expressions involving Boolean or relational expressions involving primaries. A <primary> may be an <attr_expr> or a <literal>. Literals are quoted strings, unquoted numbers, or the Boolean values true or false. In turn, an <attr_expr> may be defined, for example, as

```
<attr_expr> ::=    <qualified_name> ( <object_list> )
            |      <resource_ref>
<resource_ref>  ::=   <qualified_name>
<object_list> ::=  <primary>
            ::=    <object_list> , <primary>
```

The simplest case of an <attr_expr> is a reference to a resource instance in the form of an action formal parameter. When an <attr_expr> takes the <qualified_name> (<object_list>) form, the <qualified_name> token specifies an action to be applied to the <object_list>.

The <set_expr> (<bool_exp>) construct is a boolean-valued iteration mechanism. The <set_expr> token is defined, for example, as follows:

```
<set_expr>    ::=   <exists_expr>
              |     <each_expr>
<exists_expr> ::=   [ exists <word> in <attr_expr> ]
<each_expr>   ::=   [ each <word> in <attr_expr> ]
```

An "exists" expression (defined by <exists_expr>) returns true if at least one of the elements returned by <attr_expr> results in <bool_expr> being true. Likewise, an "each" expression (defined by <each_expr>) returns true if all of the elements returned by <attr_expr> cause <bool_expr> to be true. The <word> token is a locally scoped symbol that is assigned to each element returned by <attr_expr> in turn and used to evaluate <bool_expr>. Whereas, the <attr_expr> token will generally be an attribute lookup action returning a multi-valued result.

Additionally, the <word> token in a <set_expr> has local scope within the corresponding <bool_expr>. Thus, during the evaluation of a particular policy, several scopes are in effect. First, the global scope contains resources, actions, roles, and domains. Then, the local scope has the formal parameters of the action to which the policy applies. Next, there is a possibly deeply-nested tree of local scopes for set expressions contained within the condition. Note that symbols defined with local scope temporarily replace symbols having the same name in enclosing scopes.

Example: Electronic Funds Transfer System

Having thus discussed the syntax of a generic policy, an example will serve to further illustrate the interaction of the components as the system 100 operates to authorize access to a protected resource 104. Consider, for instance, the final stage of an electronic payment processing system 100. Two general steps will occur: writing a check and signing the check. Of course, the second step (signing the transaction) enables the transfer of funds to the creditor.

Assuming that a check is properly called for (e.g. an invoice or other payable has been signed, thus creating a desire to electronically pay the creditor), other conditions may need to be satisfied to issue the payment. For example, within the responsible organization, the maximum value of the payment may not exceed $10,000. Moreover, the person who writes the check may not be the same person who signs the check (i.e. static separation of duties). At the time the transaction is signed, the check dollar value must correspond to the authorized payment. Moreover, the check recipient must correspond to the creditor.

Additionally, the system may log the attempts to execute each step, successful or otherwise. Thus, auditors may verify payment and process integrity by examining the chain of authorization attempts, successful authorizations, authorized payment lists, and issued checks. It should be noted that these considerations are typical of payment processing within high-assurance systems.

For the current example, it will be assumed that both the check writer and the check signer have identity certificates 130 and an attribute certificate that binds their roles to their identities. When the check writer connects to the system 100 to write the exemplary check for $9500 to a payee, the enforcement entity 102 sends the check writer's identity to the decision entity 106 thereby requesting verification that the purported check writer is entitled to write checks. The decision entity 106 verifies the check writer's identity certificate 130, retrieves his attribute certificate to determine what roles the check writer holds, and evaluates the applicable policies. Additionally, the decision entity 106 may log the request and decision, and returns to the enforcement entity 102 an "authorized" decision. The enforcement entity 102 then permits the check writer to authorize the payment (i.e. write the check) and may also log the details of the event.

When the check writer completes the check request, the enforcement entity 102 notifies the check signer that a check is ready for signing. In response, the check signer makes a request to electronically sign the check. The enforcement entity 102 then sends the check signer's identity and the amount authorized ($9500) to the decision entity 106 asking if the check signer is authorized to sign a check for this amount. The decision entity 106 reads the check signer's assigned roles (either from the signer's attribute certificate 130 or from the role stored in the policy store 108) and evaluates the policies for "sign a check". Then the decision entity 106 logs the details of the request, and returns an appropriate decision. Next, the enforcement entity 102 signs the check and logs the details of the event. Had either the check writer or signer have had authority to write or sign, respectively, checks for no more than $9000, an appropriate policy stored in the policy store 108 would have caused the decision entity 106 to return a decision denying access to the check writing or signing resource.

In order to explain the syntax of the policy language the check writing example discussed earlier, in general, will now be developed in detail.

Roles for the check writing example would be defined as follows:

Role: Check_Writer;
Role: Check_Signer;

Role map entries to support the check writing example would look like, for example:

```
Map: Id: (
        "/C=US/ST=WA/L=Bellevue/O=Phantom
        Works/CN=CA Server",
        "12345",
        "/C=US/O=phantomworks.org/OU=mct/CN=John Brown"
    )
    Role: Check_Writer Time: "";
Map: Id: (
        "/C=US/ST=WA/L=Bellevue/O=Phantom
        Works/CN=CA Server",
        "12346",
        "/C=US/O=phantomworks.org/OU=mct/CN=Susan Quinn"
    )
    Role: Check_Signer Time: "";
```

The "check" resource for the example scenario is defined, for example, simply as:

Resource: Check;

Actions for the example scenario may be defined as:

Action: Check Write_Check (string payee, int amount);
Action: Check Sign_Check (Check check);

Policies for the example scenario would thus be defined, for example, as:

```
Policy: pol_write_check
    Condition: (
        ( [exists role in roles(subject)]
        (role == Check_Writer) ) &&
        ( [each role in roles(subject)]
        (role != Check_Signer) ) &&
        ( payee != name(subject) ) &&
        (amount <= 10000)
    )
```

-continued

```
    Action: Write_Check (string payee, int amount)
Policy: pol_sign_check
    Condition: (
        ( [exists role in roles(subject)]
        (role == Check_Signer) ) &&
        ( [each role in roles(subject)]
        (role != Check_Writer) ) &&
        ( payee(check) != name(subject) )
    )
    Action: Sign_Check (Check check) ;
```

In the above policies, the keyword subject refers to an object representing the authenticated user. The roles (subject) function returns a list of roles held by the user. The name (subject) function returns a string containing the subject's name. The payee (check) function returns a string containing the payee's name from the check. The roles( ), name( ), and payee( ) functions are actions that must be defined and are subject to policy. Fragments like "(role==Check_Signer)" compare a local variable containing a role instance against a literal role object. This equality comparison will be true if the corresponding attribute values for each object are equal. In the current example, roles have only "name" and "domain" attributes.

The above statements in the policy language represent these policies in English:

"People may write checks if at least one of their roles is Check_Writer."

"People may not write checks if any of their roles are Check_Signer."

"People may not write checks to themselves."

"People may write checks for up to $10,000."

"People may sign checks if at least one of their roles is Check_Signer."

"People may not write checks if any of their roles is Check_Writer."

"People may not sign checks that are payable to themselves."

Additional exemplary policies are shown below:

```
Role: Check_Writer;
Role: Check_Signer;
Map: Id: (
        "/C=US/ST=WA/L=Bellevue/O=Phantom
        Works/CN=CA Server",
        "12345",
        "/C=US/O=phantomworks.org/OU=mct/CN=John Brown"
    )
    Role: Check_Writer Time: "";
Map: Id: (
        "/C=US/ST=WA/L=Bellevue/O=Phantom
        Works/CN=CA Server",
        "12346",
        "/C=US/O=phantomworks.org/OU=mct/CN=Susan Quinn"
    )
    Role: Check_Signer Time: "";
Resource: Check;
Action: Check Write_Check ( string payee, int amount );
Action: Check Sign_Check ( Check check );
Policy: pol_write_check
    Condition: (
        ( [exists role in roles(subject)]
        (role == Check_Writer) ) &&
        ( [each role in roles(subject)]
        (role != Check_Signer) ) &&
        ( payee != name(subject) ) &&
        ( amount <= 10000)
    )
```

```
Action: Write_Check (string payee, int amount);
Policy: pol_sign_check
    Condition: (
                ( [exists role in roles(subject)]
                (role == Check_Signer) ) &&
                ( [each role in roles(subject)]
                (role != Check_Writer) ) &&
                ( payee(check) != name(subject) )
              )
    Action: Sign_Check (Check check);
```

Policy Analysis Tools

As those skilled in the art will recognize from the foregoing, if a set of policies is large or complex, it can become difficult for an administrator to understand the net effect of these policies. Nonetheless, it is important for an administrator to understand a set of policies as thoroughly as possible because a given set of policies might generate unintended consequences.

For example, a set of policies might allow someone to issue a check and perform financial auditing on the checking account. This is not desirable, and whether this is allowed may be hard to determine when the policy set has grown with time and modifications. Additionally, as the policy store 108 evolves anomalies may be inadvertently inserted. For example, one administrator may add a policy to allow some action. Later, a different administrator adds a policy to disallow that action that, in effect, nullifies the previous administrator's policy.

Perhaps the latter modification is correct and intended, but prudence suggests bringing the potential anomaly to light. Accordingly, the administrative tool 110 may contain analytic tools to enhance the administrator's understanding of the policy set. Empirical testing of the policy set can also achieve this goal. In various implementations, both analytic and empirical methods should be used together to understand the net effect of the potentially conflicting policies in the policy store 108.

It should be noted first that policy conditions may be viewed as logical predicates that examine the state of one or more users 126 associated with the enforcement entities 102. Likewise, policy conditions examine the role(s) of the user 126. Deciding whether to allow an action involves the decision entity 106 examining both kinds of information.

For a given action, there may be multiple policies that allow or disallow the action. Each policy allowing that action contains a conditional predicate (CAi). Thus, the disjunction of these predicates (CA) describes all such predicates. Likewise, each policy disallowing that action contains a conditional predicate (CDj). Thus, the disjunction of these predicate (CD) describes all such predicates. Procedurally, decision entities 106 first examine all policies that describe when an action should be disallowed (i.e., the CD). Then, the decision entities 106 examine all policies that describe when an action should be allowed (i.e., the CA). If none of the policies in both the CA and the CD evaluate to true, authorization for this action is disallowed by default. Thus, the following describes the declarative semantics of the decision entities:

Disallow=(CD or (not CA))
Allow=((not CD) and CA)

In order to understand the types of analyses tools that may be incorporated in the administrative tool 110, a few additional terms will be defined. First, the term "atom" will refer to a Boolean formula or expression (e.g., "system:hasRole (subject, "publisher"), as well as (size(file)>10000)"). The term "literal" will refer to an atom, possibly negated. Next the term "implicant" will refer to a conjunction of literals. Moreover, a disjunctive normal form (dnf) will refer to a disjunction of implicants. Thus, a dnf may represent either policy conditions; the disallow predicate (CD) for an action; the allow predicate (CA) for an action; or an arbitrary condition that an administrator may enter (i.e., test) while analyzing the policy set.

Given one of more dnfs (of for example the policy conditions), the administrative tools analyze the following properties of the dnfs representing the policy conditions (i.e. the allow and disallow predicates CA or CD and even the arbitrary condition):

| | |
|---|---|
| Valid (dnf): | is the dnf always true? |
| Inconsistent (dnf: | is the dnf always false? |
| Consistent (dnf): | does at least one situation satisfy the dnf? |
| Implies (dnf1, dnf2): | whenever dnf1 holds must dnf2 always hold? |
| Iff (dnf1, dnf2): | are dnf1 and dnf2 equivalent? |

Thus, the policy analyzer may provide an analysis of whether a single policy is always true or false and whether the condition of an allow policy is subsumed by the deny policies for that action (i.e., implies (CAi, CD)). For a single action, the policy analyzer may also determine whether the action is always allowed or denied. Moreover, the policy analyzer may determine whether, given some arbitrary condition, the action is allowed (i.e., what if analysis).

For systems with two actions (action 1 and action 2) the policy analyzer may also perform an action composition analysis by determining whether:

action 2 is always allowed when action 1 is allowed;
action 2 is always denied when action 1 is allowed;
action 2 is always allowed when action 1 is denied; and
action 2 is always denied when action 1 is denied.

Figure 8:
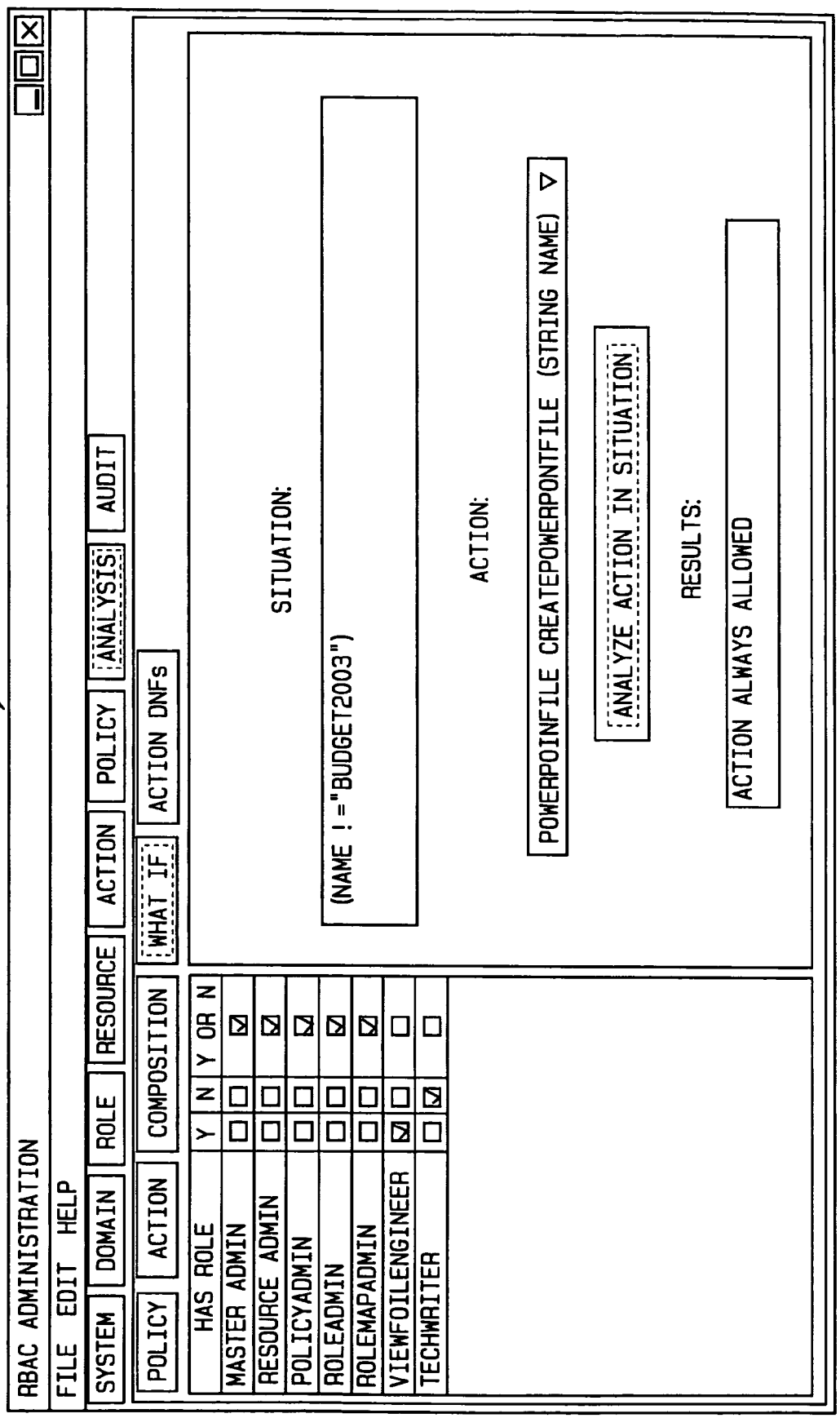
FIG. 8 is still another exemplary graphical user interface in accordance with the principles of the present disclosure.

Of course, the analysis can be extrapolated to systems having numerous actions. The occurrence of any of these situations does not imply that anything is necessarily wrong with the policy store 108. However, these situations are probably worth pointing out to an administrator as indicative of potential anomalies. In addition, the dnf conditions for allowing and denying actions can be viewed. This may serve as a useful summary of all policies pertaining to an action. A graphic user interface 150 for one type of analysis is shown in FIG. 8.

In another embodiment, the policy tool 110 determines whether the policy set contains any conditions containing enumerations (e.g., a policy applies to a listed set of roles). For such conditions, the policy analyzer assumes that at least one of the enumerations results in a false evaluation of the condition. Accordingly, processing resources are conserved for use in other operations. Should an administrator wish to evaluate each enumeration, the policy analyzer could be so configured. In the alternative, each enumeration in the condition can be represented by a separate condition correspondingly containing only one of the enumerated conditions. Thus, the administrative tool 110 will analyze each enumeration as a separate condition, thereby providing more thorough results.

Additionally, it is worth noting that some of the primitive analysis building blocks (e.g., valid (dnf), consistent (dnf), and implies (dnf1, dnf2)) may be practically unsolvable in complex, real world settings. For instance, the analysis of a given primitive may be analogous to proving a negative. Of course, such an analysis is "logically" impossible.

Thus, whenever the policy analyzer returns a false result for a particular primitive the result might be either false or unknown depending on the primitive analyzed. It should be noted, however, that when the policy analyzer does return a true result for a particular primitive, the result is indeed true (e.g. it is "logically" possible to prove a true statement.) Such a true, or positive, result is displayed on the graphical user interface 150 at result display 152 (see FIG. 8).

Whenever a result is shown as absent, the absence means that the result is theoretically unknown, but for the known inputs it is false. Thus, even for situations where thorough analysis is not possible, the policy analyzer may return meaningful results based the known conditions and inputs. In the alternative, results display 152 could display the message "false," "unknown" or "false for the given conditions."

In another embodiment of the present disclosure, an equation solver (e.g., a solver from Mathematica) is included in the administrative tool 110 to analyze the policy set for potential inconsistencies between the primitives (e.g., a condition x<0 and x>10). Likewise, automated theorem provers or model-checkers may be added to increase the efficacy of the analysis.

Example: An Information Escrow System

In other various embodiments, the protected resource 104 may be sensitive data such as information being sought by an outside requester. For instance, the protected resource 104 may be a file containing information sought by law enforcement personnel or parties to a civil lawsuit. In such situations, an un-authorized release of the information, via access to the protected resource, could have serious consequences for the information custodian.

Accordingly, the present disclosure may be used to protect the sought after information from unauthorized release. In the current embodiment, the information custodian is one user 126 assigned the role of a custodian. Additionally, another user 126 is assigned the role of overseer, or notary, to ensure that due process and other legal considerations are satisfied with respect to the requested release. Thus, the current embodiment envisions a policy requiring the simultaneous presence of the users corresponding to the three roles: requester, custodian, and notary.

Each of the three users 126 first presents their PKI identity certificates to the escrow system 100 for non-repudiation purposes. Whereupon, the policy enforcement entity 102 authenticates the identities of the users 126. Then the policy enforcement entity 102 forwards the request to the policy decision point 106. Thereupon, the policy decision point 106 evaluates the policy(s) applicable to the release of the sensitive information 104.

If the simultaneous presence of the three users 126, and their assigned roles satisfies the applicable policy, then the policy decision entity 106 returns an affirmative response to the policy enforcement entity 102. Accordingly, the policy enforcement entity 102 provides the requester 126 the protected resource 104. Otherwise, access is denied.

Additional security may also be provided using the other encryption techniques incorporated in the present disclosure. For instance, the three users 126 may be required to make their request, and present their PKI identity certificates, to a trusted device with a hardware cryptographic engine. Likewise, the users 126 may be required to electronically sign their requests and transactions. Moreover, each of the three users 126 may be required to present ⅓ of the encryption key that had previously been used to encrypt the protected resource 104. The trusted device then recombines the three portions of the key (once the policy has been satisfied) to retrieve the protected resource 104.

Moreover, either the policy enforcement or decision entities (or both) may report the various steps of the transaction to the auditing subsystem 132. Thus the present embodiment provides a signed, traceable, and trusted transaction audit chain. Additionally, it should be noted that the presence of the notary prevents the custodian or requester from acting as rogues and accessing the protected object 104 without proper authorization. Moreover, the split escrow key imposes an additional condition of multiple, simultaneous concurrence from the three users 126 to allow access. In other embodiments, the key may be split into any number of portions with the presence of the same number users (each presenting a portion) being required to satisfy the access policy associated with the information.

A Policy-Enabled Role Based Access Control Management and Operation Method

Figure 9:
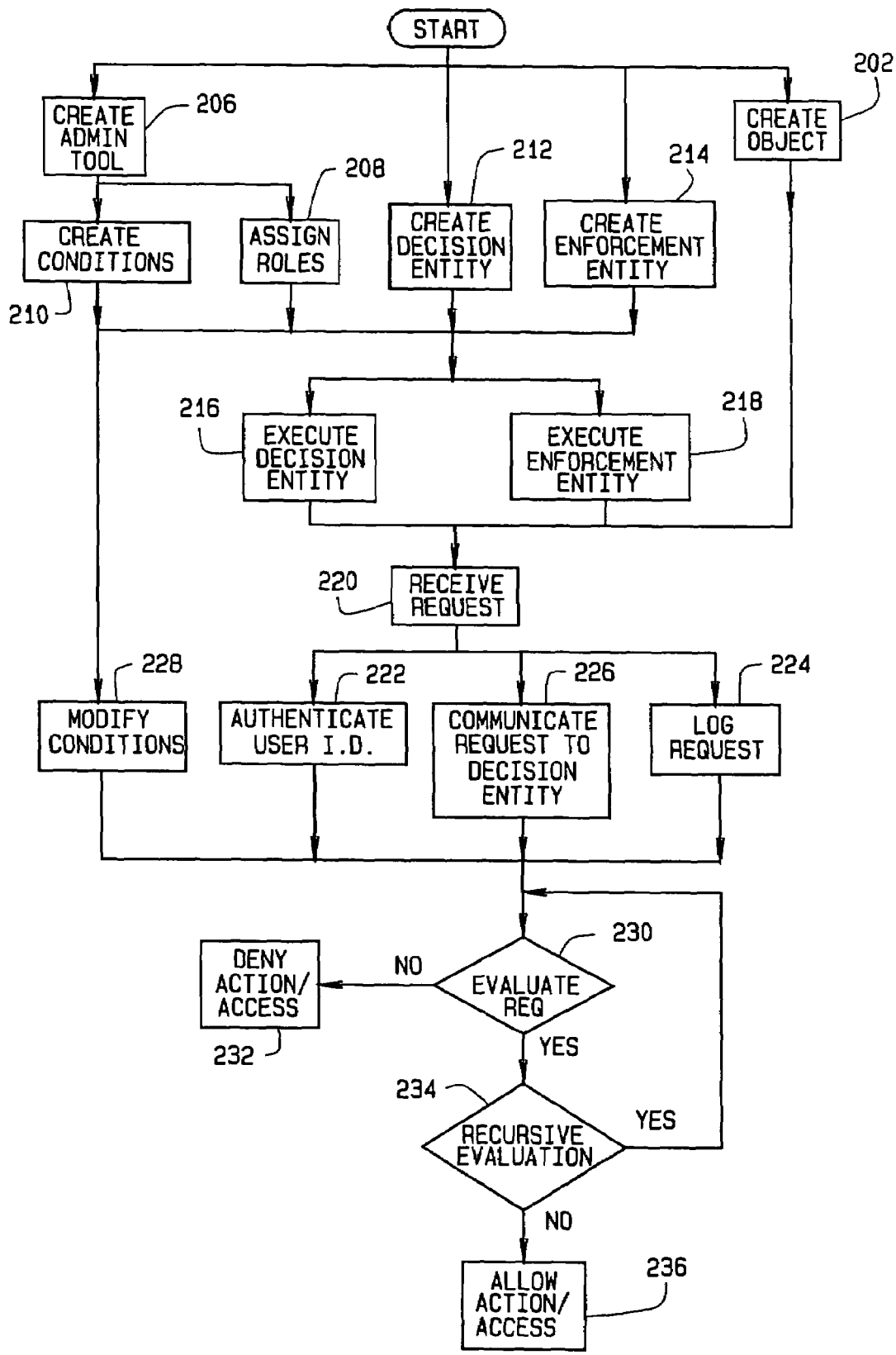
FIG. 9 is a flowchart of a method in accordance with various embodiments of the present disclosure.

With reference now to FIG. 9, a method for managing and operating policy-enabled role based access control in accordance with various embodiments of the present disclosure is illustrated. The management or operation method 200 includes creating an object or resource as in operation 202. For various reasons the owner of the object may desire to protect the object from unauthorized access.

In various implementations, at some time before a user requests access to the object, an administration tool is created in step 206. In turn, roles are assigned to the various users and the role based conditions controlling access are created in operations 208 and 210, respectively. Of course, the administrative tool may be employed to assign (or map) the roles and create the conditions. In the meantime, the decision and enforcement entities may be created, programmed, installed, or configured to control access to the object as in operations 212 and 214. Thereafter, in operations 216 and 218, the decision and enforcement entities are started, or executed, or otherwise enabled to provide access protection to the object.

Upon receipt of an access request in operation 220, the enforcement entity may take one, or more, of several actions. For instance, the enforcement entity may authenticate the identity of the requester. See operation 222. Additionally, the enforcement entity may log the request for auditing and intrusion detection as in operation 224. The enforcement entity also communicates the request and the requestor's role(s) to the decision entity for evaluation. See operation 226.

Once the decision entity receives the request along with the role of the requester, the decision entity (in operation 230) evaluates whether the requestor's role allows the requester access to the protected object. If the role based access control condition(s) prohibits the requester from access to the object, the decision entity communicates the denial to the enforcement entity. In turn, the enforcement entity refuses the request for access as in operation 232.

Of course, some requests may trigger recursive evaluations in which the evaluation of a condition requires an action subject to another condition, or policy. Accordingly, the decision entity recursively evaluates the conditions as necessary to determine whether the requester may be granted access to the protected object. Moreover, the conditions may necessitate the decision entity calling upon the enforcement entity, or other entities, to execute the necessary action. See operation 234.

If the role of the requester fails to satisfy any of the conditions, or if any of the actions necessary to evaluate the condition(s) fail, access is denied. See operation 232 again. Alternatively, if the role satisfies all of the applicable conditions and all of the necessary actions succeed, then the decision entity communicates the authorization decision to the enforcement entity. In turn, the enforcement entity allows the requester the requested action. See operation 236.

Those skilled in the art will appreciate that the present disclosure provides flexible methods and systems to implement role based access control. Moreover, the present disclosure provides for the secure storage of sensitive objects, applications, and files. Moreover, by separating the policy enforcement and decision functions the present disclosure allows policy enforcement at distributed clients. Thus, the present disclosure avoids the creation of centralized access control (combining both enforcement and decision) bottlenecks that are prone to single point failures and inefficient execution. Likewise, the present disclosure reduces the load on the servers on which the prior art policy control mechanisms reside.

Additionally, by providing enforcement enabled applications, the present disclosure supports data dissemination in complex organizations having diverse access requirements. Moreover, the present disclosure separates the creation and administration of access policies from the development of application programs. Likewise, the present disclosure separates the enforcement of policy and policy decision functions. As a result, the role based access control frameworks provided by the present disclosure are more manageable, reusable, and efficient than heretofore possible. Moreover, because of the separation of functions, one application (acting alone) cannot ignore access policies or decisions and act alone to access the information. Accordingly, the present disclosure provides improved security.

While various embodiments have been described, those skilled in the art will recognize modifications or variations which might be made without departing from the inventive concept. The examples illustrate the disclosure and are not intended to limit it. Therefore, the description and claims should be interpreted liberally with only such limitation as is necessary in view of the pertinent prior art.

What is claimed is:

1. A method of implementing role based control of access to a plurality of resources of a network having a plurality of domains, the method comprising:
   for each domain, storing a plurality of policy statements in one or more policy stores associated with the domain, the policy statements defined to control performance of actions relative to the resources and to associate one or more users of the network with one or more of a plurality of roles defined in the policy statements, the storing including at least one of the following: changing one or more previously stored associations of a user with one or more roles, and deleting one or more previously stored associations of a user with one or more roles;
   for each domain, associating one or more policy decision entities with the domain;
   using an enforcement entity corresponding to an application in the network to receive a request, from a user of the application, for use of one of the resources in the application;
   using the enforcement entity to communicate the resource request and one or more roles of the user of the application to a recipient policy decision entity associated with one of the domains, the communication performed via an application program interface (API) between the enforcement entity of the application and the recipient policy decision entity;
   using a policy engine of the recipient policy decision entity to evaluate policies defined by the policy statements of the one of the domains relative to the one or more communicated roles and relative to the requested resource; and
   using the enforcement entity to allow the user to use the requested resource based on the evaluation by the recipient policy decision entity;
   the method performed by one or more computers of the network.

2. The method according to claim 1, wherein the resource request includes a request to perform a first action relative to the resource, the method further comprising using the enforcement entity to perform a second action to perform the evaluation.

3. The method according to claim 2, further comprising using the recipient policy decision entity to decide whether at least one of the roles satisfies a role based access control condition associated with the second action.

4. The method according to claim 2, wherein the first action further comprises an administrative action.

5. The method according to claim 4, wherein the at least one of the roles further comprises an administrative role.

6. The method according to claim 1, further comprising using different processors to execute the recipient policy decision entity and the enforcement entity.

7. The method according to claim 2, further comprising executing an administrative entity to modify the first action.

8. The method according to claim 1 wherein the recipient policy decision entity is an administrative entity.

9. The method according to claim 1, wherein the enforcement entity is used to communicate with more than one policy decision entity.

10. The method according to claim 1, the requested resource having one or more attributes defined in the application, the method further comprising using the policy engine to evaluate the policies relative to the one or more roles and relative to the one or more resource attributes.

11. A system to implement role based control of access to a plurality of resources of a network, the system comprising one or more processors and memory configured to:—
    upon request for a resource by a user of an application of the network, and using a policy decision entity, access one or more policy stores associated with a domain of the network, the stores including a plurality of policies for controlling access to at least some of the resources including the requested resource, the policies defined using policy statements defining one or more associations of one or more users of the system with one or more roles, the policy statements changeable to provide one or more of the following: a change in one or more of the associations, and a deletion of one or more of the associations;
    using a policy enforcement entity corresponding to the application, perform one or more actions to provide information for use by the policy decision entity in evaluating one or more policy conditions relating to the requested resource, the one or more actions performable subject to one or more of the plurality of policies; and
    based on an evaluation by the policy decision entity of one or more policies relating to the requested resource and to the one or more performable actions, use the enforcement entity corresponding to the application to enforce a decision by the policy decision entity as to the request, the evaluation including a determination as to whether the requesting user is currently associated in the policies with a given role.

12. The system according to claim 11, wherein the policy decision entity uses a policy engine to make the decision.

13. The system according to claim 12, wherein the domain is an administrative domain, the system further configured to provide for administrative policy-based access.

14. The system according to claim 11, wherein the user request is for an administrative action.

15. The system according to claim 14, wherein the request is role-based on an administrative role of the user.

16. The system according to claim 11, wherein the policy decision entity and the enforcement entity are executed by different processors.

17. The system according to claim 11, wherein the one or more processors and memory are configured to provide for a first administrative entity to modify one or more of the policies.

18. The system according to claim 17, further comprising a second administrative entity associated with a second domain of the network, the first and second administrative entities having policy-based access to different policy stores.

19. The system according to claim 11, wherein the domain is an administrative domain, and the policies of the one or more policy stores are configured to control the implementation of other policies.

20. The system according to claim 11, further comprising means to encrypt the request and the decision.

21. An apparatus to implement role based access control in a network, the apparatus comprising one or more processors and memory configured to, for a plurality of domains of the network:
for each domain, store in one or more policy stores a plurality of policies for controlling performance of actions relative to at least some resources of the network, the policies defined using policy statements associating a plurality of roles with a plurality of users of the network, at least some of the policies differing among the domains, the policies changeable to provide at least one of the following: a change in one or more of the associations, and a deletion of one or more of the associations;
for each domain, associate one or more policy decision entities with the domain;
use an enforcement entity corresponding to an application in the network to receive a request for a resource from a user of the application and to communicate the resource request and one or more roles of the user to a recipient policy decision entity associated with one of the domains;
use a policy engine of the recipient policy decision entity to evaluate the policies of the one of the domains relative to the one or more roles and relative to the requested resource; and
use the enforcement entity to allow the user to use the requested resource based on a decision by the recipient policy decision entity using the evaluation.

22. The apparatus according to claim 21, wherein the evaluation comprises requiring an action by the enforcement entity to obtain information from the network for use by the recipient policy decision entity in deciding whether the one or more roles satisfies a first policy condition.

23. The apparatus according to claim 22, wherein the action is associated with a second policy condition.

24. The apparatus according to claim 21, wherein the action further comprises an administrative action.

25. The apparatus according to claim 24, wherein the role further comprises an administrative role.

26. The apparatus according to claim 21, wherein the policy decision entity and the enforcement entity are executed by different processors.

27. The apparatus according to claim 22, wherein the one or more processors and memory are configured to execute an administrative entity to modify the first policy condition.

28. The apparatus according to claim 22, wherein the one or more processors and memory are further configured to execute an administrative entity to analyze a policy set that includes the first policy condition.

29. The apparatus according to claim 22, wherein the one or more processors and memory are configured to modify the first policy condition.

30. The apparatus according to claim 21, further comprising means to encrypt the request and the decision.

31. A computer network system to implement role based access, the network system having a plurality of domains, the network system comprising:
one or more processors and memory configured to: store in one or more policy stores a plurality of policy statements to provide policies for controlling performance of actions relative to at least some resources of the network system, the policy statements defining one or more associations of one or more users of the network system with one or more roles, the policy statements changeable to provide one or more of the following: a change in one or more of the associations, and a deletion of one or more of the associations;
for each domain, associate one or more policy decision entities with the domain;
during execution of a user application, use an enforcement entity corresponding to the application to receive a request for a resource from the application and to communicate the resource request and one or more roles of a user using the application to a recipient policy decision entity associated with one of the domains;
use a policy engine of the recipient policy decision entity to evaluate the policies of the one of the domains relative to the one or more roles and relative to the requested resource; and
use the enforcement entity to allow the application to use the requested resource based on a decision by the recipient policy decision entity using the evaluation, the evaluation including a determination as to whether the user is currently associated in the policies with a given role.

* * * * *

UNITED STATES PATENT AND TRADEMARK OFFICE
CERTIFICATE OF CORRECTION

PATENT NO. : 7,640,429 B2  Page 1 of 1
APPLICATION NO. : 10/788151
DATED : December 29, 2009
INVENTOR(S) : Huang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1289 days.

Signed and Sealed this

Ninth Day of November, 2010

David J. Kappos
*Director of the United States Patent and Trademark Office*